United States Patent

Matsuyama et al.

[11] 4,037,930
[45] July 26, 1977

[54] LIQUID CRYSTAL DISPLAY CELLS

[75] Inventors: Shigeru Matsuyama; Masaharu Koyama, both of Mobara; Masayoshi Kasai, Chiba; Mamoru Tsuzurahara; Kazuo Sunahara, both of Mobara, all of Japan

[73] Assignee: Hitachi, Ltd., Tokyo, Japan

[21] Appl. No.: 674,041

[22] Filed: Apr. 5, 1976

[51] Int. Cl.² ................................................. G02F 1/13
[52] U.S. Cl. ................................................. 350/160 LC
[58] Field of Search ................................... 350/160 LC

[56] References Cited

U.S. PATENT DOCUMENTS

| | | | |
|---|---|---|---|
| 3,751,137 | 8/1973 | Fitzgibbons et al. | 350/160 LC |
| 3,771,855 | 11/1973 | Burns | 350/160 LC |
| 3,932,024 | 1/1976 | Yaguchi et al. | 350/160 LC |
| 3,967,882 | 7/1976 | Kubota et al. | 350/160 LC |
| 3,970,363 | 7/1976 | Geyer et al. | 350/160 LC |
| 3,990,781 | 11/1976 | Gum | 350/160 LC |
| 3,990,782 | 11/1976 | Yamasaki | 350/160 LC |
| 3,992,082 | 11/1976 | Katz | 350/160 LC |

FOREIGN PATENT DOCUMENTS

| | | | |
|---|---|---|---|
| 1,381,077 | 1/1975 | United Kingdom | 350/160 LC |
| 1,381,429 | 1/1975 | United Kingdom | 350/160 LC |

*Primary Examiner*—Edward S. Bauer
*Attorney, Agent, or Firm*—Charles E. Pfund

[57] ABSTRACT

In a liquid crystal display cell wherein two glass plates are sealed to a peripheral sealing member provided with a liquid crystal inlet port, the peripheries of the glass plates generally project slightly beyond the periphery of the peripheral sealing member thus forming a shallow groove. Low melting point glass filler is filled in the groove about the inlet port. A metal layer is applied onto the filler and finally a solder layer is applied onto the metal layer to seal the inlet port.

5 Claims, 12 Drawing Figures

LIQUID CRYSTAL DISPLAY CELLS

BACKGROUND OF THE INVENTION

This invention relates to an improved construction of a liquid crystal display cell and more particularly to a liquid crystal display cell in which the liquid crystal is filled into the cell through an inlet port or opening provided for a peripheral sealing member which supports and secures spaced glass plates of the cell and the inlet port is hermetically sealed by an inlet port sealing member.

A liquid crystal display cell generally comprises a pair of spaced insulating plates such as glass plates which are hermetically secured to a peripheral sealing member provided with an inlet port for filling the liquid crystal. The profile of the peripheral sealing member is defined on a glass plate by a silk-screen printing machine in a general manner. However, in a small liquid crystal display cell for use in small timepieces for example, the spacing between the glass plates is only 6 to 10 microns so that the width of the inlet port provided through the side surface of the peripheral sealing member inserted in such small spacing is less than 1 mm. Accordingly, care should be taken not to close or decrease the area of the inlet port during assembly of the cell, and it is generally difficult to secure the glass plates to the peripheral sealing member with the peripheries of the glass plates and the periphery of the peripheral sealing member being flush with each other. Sometimes the peripheral portions of the glass plates project about 4 to 20 microns beyond the periphery of the peripheral sealing member.

FIG. 1a shows a plan view and FIG. 1b a side view of a liquid crystal display cell in which the glass plates project beyond the periphery of the peripheral sealing member and the inlet port for filling the liquid crystal is not yet sealed.

As shown, the cell comprises a pair of glass plates 1 and 2 secured to the opposite surfaces of a peripheral sealing member 3 made of low melting point glass, for example. Liquid crystal and display electrodes (not shown) are housed in the cell. An inlet port 4 for filling the liquid crystal into the cell is provided through a portion of the peripheral sealing member between the glass plates.

FIG. 2 shows some examples of the prior art inlet port sealing member for sealing the inlet port of a cell in which the peripheries of the glass plates project beyond the periphery of the peripheral sealing member. According to one example shown in FIGS. 2a and 2b, a metal layer 5 is formed on the portion of the glass plates about the inlet port by, for example, vapour deposition or ion plating and a solder 6 is applied onto the metal layer 5 for sealing the inlet port 4. Of course, the joints between the glass plates and the peripheral sealing member other than the inlet port are hermetically sealed by the adhesion of the peripheral sealing member made of low melting glass.

In this construction, since the metal layer 5 is formed prior to the assembly of the glass plates and the peripheral sealing member, the portions of the peripheral sealing member 3 about the inlet port 4 is not formed with a metal layer and after application of the inlet port sealing member or solder, a fine passage 9 having a depth of 4 to 20 microns is formed along the outer surface of the peripheral sealing member 3 and between the plates. Accordingly, it has been necessary to seal the opposite ends of the passge 9. If the low melting point glass is used for this purpose it is necessary to heat the cell and such heating deteriorates the liquid crystal. For this reason, room temperature setting type organic resins have been used as the sealing agent.

However, room temperature setting type sealing agents have a higher tendency to chemically react with the liquid crystal than other inorganic sealing agents such as low melting glass and solder. Moreover, since the organic sealing agents do not have properties for preventing humidity in the ambient atmosphere from passing therethrough, the liquid crystal quickly deteriorates due to hydrolysis. Further their resistance to weather, ultraviolet ray, for example, is low. To solve these difficulties it has been proposed to apply a metal layer 5a to surround the inlet port 4, on both glass plates 1 and 2 and the peripheral sealing member 3, as shown in FIGS. 2c and 2d. However, due to offset relationship between the glass plates and the peripheral member it has been difficult to form a continuous metal layer to completely cover the side surfaces of the glass plates and the peripheral sealing member so as to eliminate passage 9.

SUMMARY OF THE INVENTION

It is an object of this invention to provide an improved liquid crystal display cell provided with a novel inlet port sealing means capable of sealing the cell at high air tightness.

Another object of this invention is to provide a liquid crystal display cell including an improved inlet port sealing means capable of air tightly sealing the liquid crystal inlet port without using a sealing agent consisting of an organic resin According to this invention these and further objects can be accomplished by providing a liquid crystal display cell of the type wherein a pair of insulating plates are hermetically sealed to a peripheral sealing member extending substantially entirely along the peripheries of said plates and therebetween and including at least one inlet port therein for filling a liquid crystal into the cell, the peripheries of the insulating plates slightly projecting beyond the periphery of the peripheral sealing member thus defining a shallow groove, characterized by comprising a filler filling the groove about the inlet port, a metal layer which is applied onto the filler to cover the filler and the side surfaces of the insulating plates and an inlet port sealing member applied to the metal layer for sealing the inlet port.

According to one embodiment, the filler fills only the groove with its surface flush with the side surfaces of the insulating plates. According to a modified embodiment, the filler is applied to cover also the side surfaces of the insulating plates for filling cracks therein.

BRIEF DESCRIPTION OF THE DRAWINGS

In the accompanying drawings:

FIG. 1b is a side view of the cell shown in FIG. 1a;

DESCRIPTION OF THE PREFERRED EMBODIMENTS

Figure 1A:
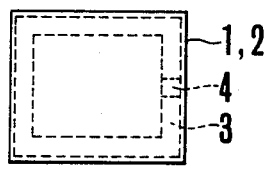
FIG. 1a shows a plan view of one example of a liquid crystal display cell before sealing the liquid crystal inlet port.
Figure 1B:
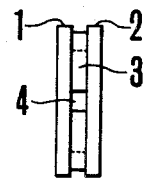
Figure 2A:
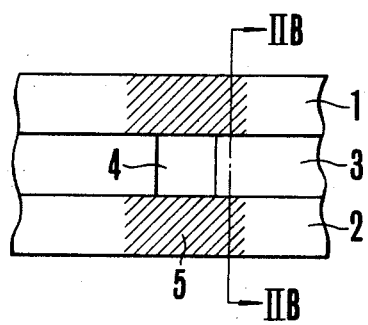
FIG. 2a is a partial side view of a cell showing one example of the prior art sealing means for closing the liquid crystal inlet port.
Figure 2B:
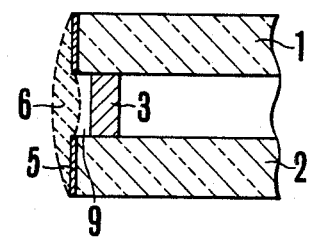
FIG. 2b is a sectional view of the cell shown in FIG. 2a taken along a line IIB — IIB.
Figure 2C:
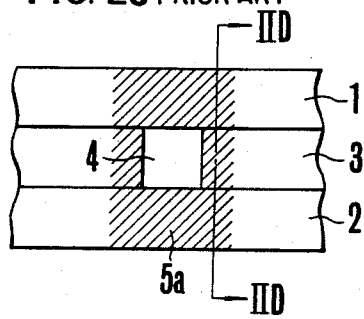
FIG. 2c is a partial view similar to FIG. 2a showing another example of the prior art sealing means for the liquid crystal inlet port.
Figure 2D:
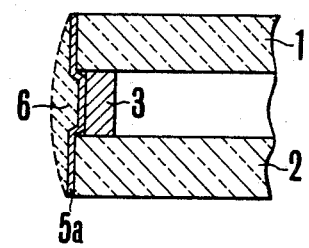
FIG. 2d is a sectional view of the cell shown in FIG. 2c taken along a line IID — IID.
Figure 3A:
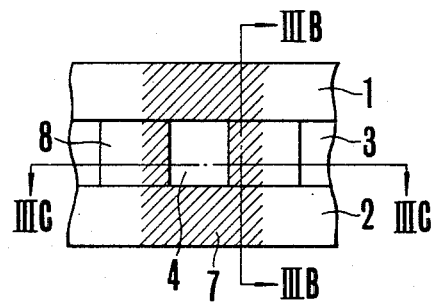
FIG. 3a is a partial view showing one example of the sealing means of this invention for closing the liquid crystal inlet port.
Figure 3B:
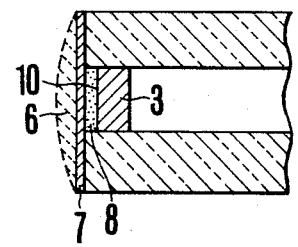
FIG. 3b is a sectional view of the cell shown in FIG. 3a taken along a line IIIB — IIIB.
Figure 3C:
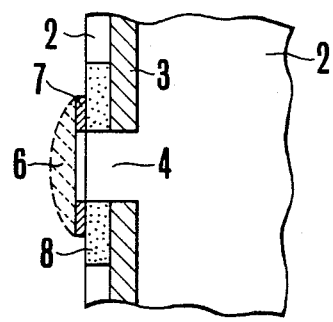
FIG. 3c is a sectional view of the cell shown in FIG. 3a taken along a line IIIC — IIIC.

In the embodiment shown in FIGS. 3a, 3b and 3c glass plates 1 and 2 are shown to offset or project beyond the periphery of a peripheral sealing member 3 by about 4 to 20 microns, thus forming a shallow groove. According to this invention a filler consisting of low melting point frit glass is filled in the groove around the inlet port 4 to form an outer surface flush with the side surfaces of the glass plates. The cell is fired for 30 minutes at a temperature of about 470° C thus forming a glass layer 8 that eliminates the offset. The low melting point frit glass consists of 5.0% by weight of $SiO_2$, 5.0% by weight of $ZnO_2$, 75% by weight of PbO and 15.0% by weight of $B_2O_3$, and a solvent for example. Thereafter, a metal layer 7 is applied on the surfaces of the glass plates 1 and 2 and the glass layer 8 by vapour deposition or iron plating to surround the liquid crystal inlet port 4. The metal layer 7 takes the form of, for example, a lamination of Ni — Cr alloy layer having a 1000 to 1100 A thickness and an Au layer having a 2000 to 5000 A thickness applied thereon. After filling the liquid crystal into the cell through the inlet port 4, a solder 6 as the inlet port sealing member is applied onto the metal layer 7.

With this construction, since the offset is eliminated, the inlet port is hermetically sealed so that it is not necessary to use an organic sealing agent. Since no organic substance is used for sealing the inlet port there is no fear of deteriorating the liquid crystal by chemical reaction. The inlet port sealing can be completed by a single soldering operation, thus greatly improving the reliability of the inlet port seal.

Figure 4A:
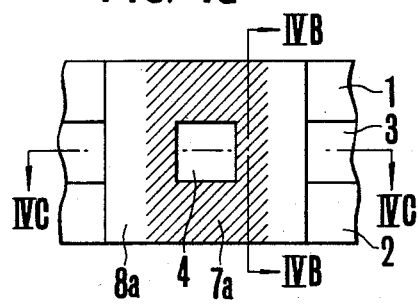
FIG. 4a is a partial view of a modified inlet port sealing means embodying the invention.
Figure 4B:
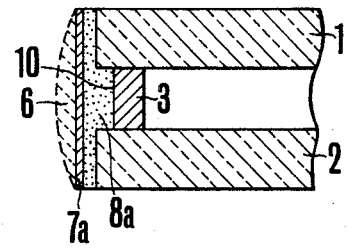
FIG. 4b is a sectional view of the cell shown in FIG. 4a taken along a line IVB — IVB and FIG. 4c is a sectional view of the cell shown in FIG. 4a taken along a line IVC — IVC.
Figure 4C:
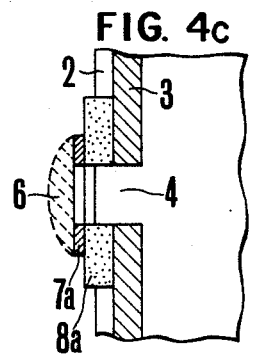

FIGS. 4a, 4b and 4c show a modified sealing means for the inlet port. In this modification, a layer of low melting point frit glass 8a is formed not only to fill the groove caused by the offset but also to cover the side surfaces of glass plates 1 and 2. The frit glass applied to the side surfaces of glass plates permeates into small cracks created in these side surfaces and forms a smooth flat surface on account of a surface tension of the frit glass. After drying for 30 minutes at a temperature of 150° C, the low melting point frit glass is fired at a temperature of about 470° C for 30 minutes to obtain glass layer 8a having a flat surface. The low melting point frit glass utilized in this modification has the same composition as that used in the first embodiment. A metal layer 7a of a nickel-chromium alloy and gold thereon, for example, is applied onto the glass layer 8a by using a mask. Since the surface of the glass layer 8a is smooth and flat, the metal layer 7a firmly adheres thereto. After filling the liquid crystal into the cell, the inlet port 4 is hermetically closed by applying an inlet port sealing member 6 made of solder for example.

This modified embodiment has the following advantage over the first embodiment. More particularly, when the glass plates 1 and 2 are cut by a diamond cutter, a large number of fine cracks are created in the side surfaces of the glass plates. Such cracks grow due to heat of soldering thus causing fracture of the periphery of the inlet port 4. Since the cut surface is coarse, small gaps or interstices would be formed between the side surfaces of the glass plates and the metal layer formed thereon, thus making it difficult to form firm bonding therebetween. Consequently, where the thickness of the metal layer is increased it will peel off at the time of applying the solder film. To obtain a smooth and flat surface, polishing is generally used, but in order to eliminate the difficulty described above it is necessary to use precise polishing of the optical grade which increases cost of the cell.

However, according to the modification shown in FIGS. 4a, 4b and 4c, since the low melting point glass layer 8a extending from the offset covers the side surfaces of the glass plates 1 and 2, it permeates into the small cracks to increase the bonding strength as well as the air tightness. Moreover, as the glass layer 8a increases the bonding surface between it and the metal layer 7a, it is possible to perfectly prevent leakage of the liquid crystal along the side surfaces of the glass plates.

While, in the foregoing description, the paired insulating plates have been materialized as the two glass plates, the invention is not limited to this construction and may be applied to a liquid crystal display cell comprising the insulating plates 1 and 2 one of which is a transparent plate and the other of which is an opaque plate made from, for example, ceramics.

What is claimed is :

1. In a liquid crystal display cell of the type wherein a pair of insulating plates are hermetically sealed to a peripheral sealing member extending substantially entirely along the peripheries of said plates and therebetween and including at least one inlet port therein for filling a liquid crystal into the cell, the peripheries of the insulating plates slightly projecting beyond the periphery of the peripheral sealing member thus defining a shallow groove, the improvement which comprises a filler filling said groove about said inlet port, a metal layer which is applied to cover said filler and the side surfaces of said insulating plates, and an inlet port sealing member applied to said metal layer for sealing said inlet port.

2. The improvement according to claim 1 wherein said filler fills only said groove with its surface flush with the side surfaces of said glass plates.

3. The improvement according to claim 1 wherein said filler not only fills said groove but also extends to cover the side surfaces of the insulating plates.

4. The improvement according to claim 1 wherein said filler consists of low melting point glass.

5. The improvement according to claim 1 wherein said inlet port sealing member comprises a solder layer.

* * * * *